(12) United States Patent
Lindner et al.

(10) Patent No.: US 10,404,969 B2
(45) Date of Patent: Sep. 3, 2019

(54) METHOD AND APPARATUS FOR MULTIPLE TECHNOLOGY DEPTH MAP ACQUISITION AND FUSION

(71) Applicant: QUALCOMM Incorporated, San Diego, CA (US)

(72) Inventors: Albrecht Johannes Lindner, La Jolla, CA (US); Kalin Mitkov Atanassov, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 14/601,073

(22) Filed: Jan. 20, 2015

(65) Prior Publication Data

US 2016/0212411 A1 Jul. 21, 2016

(51) Int. Cl.
*G06K 9/00* (2006.01)
*H04N 13/271* (2018.01)
(Continued)

(52) U.S. Cl.
CPC .......... *H04N 13/271* (2018.05); *G01C 11/00* (2013.01); *G06T 5/50* (2013.01); *G06T 7/507* (2017.01);
(Continued)

(58) Field of Classification Search
None
See application file for complete search history.

(56) References Cited

U.S. PATENT DOCUMENTS 5,852,672 A * 12/1998 Lu ...................... G01B 11/2441
356/604
6,084,979 A * 7/2000 Kanade ................ H04N 13/243
382/154
(Continued)

FOREIGN PATENT DOCUMENTS

CN 102385237 A 3/2012
CN 103139469 A 6/2013
(Continued)

OTHER PUBLICATIONS

Depth discontinuities by pixel-to-pixel stereo, Birchfield et al., IJOCV, vol. 35(3), 1999, pp. 269-293.*
(Continued)

*Primary Examiner* — Jayesh A Patel
(74) *Attorney, Agent, or Firm* — Paradice and Li LLP

(57) ABSTRACT

Systems, apparatus, and methods for generating a fused depth map from one or more individual depth maps, wherein the fused depth map is configured to provide robust depth estimation for points within the depth map. The methods, apparatus, or systems may comprise components that identify a field of view (FOV) of an imaging device configured to capture an image of the FOV and select a first depth sensing method. The system or method may sense a depth of the FOV with respect to the imaging device using the first selected depth sensing method and generate a first depth map of the FOV based on the sensed depth of the first selected depth sensing method. The system or method may also identify a region of one or more points of the first depth map having one or more inaccurate depth measurements and determine if additional depth sensing is needed.

24 Claims, 4 Drawing Sheets

(51) Int. Cl.
| | |
|---|---|
| *G01C 11/00* | (2006.01) |
| *G06T 5/50* | (2006.01) |
| *H04N 13/128* | (2018.01) |
| *H04N 13/218* | (2018.01) |
| *G06T 7/507* | (2017.01) |
| *G06T 7/521* | (2017.01) |
| *G06T 7/593* | (2017.01) |
| *G01C 11/36* | (2006.01) |
| *H04N 13/00* | (2018.01) |

(52) U.S. Cl.
CPC ............ *G06T 7/521* (2017.01); *G06T 7/593* (2017.01); *H04N 13/128* (2018.05); *H04N 13/218* (2018.05); *G01C 2011/36* (2013.01); *G06T 2200/04* (2013.01); *G06T 2207/10012* (2013.01); *G06T 2207/10028* (2013.01); *G06T 2207/20221* (2013.01); *H04N 2013/0081* (2013.01)

(56) References Cited

U.S. PATENT DOCUMENTS

| | | | |
|---|---|---|---|
| 6,868,191 B2* | 3/2005 | Nister | G06T 7/55 345/419 |
| 8,447,098 B1 | 5/2013 | Cohen et al. | |
| 8,633,970 B1* | 1/2014 | Mercay | G06F 3/14 345/633 |
| 9,117,295 B2* | 8/2015 | Rastogi | G06T 5/50 |
| 9,460,551 B2* | 10/2016 | Pettersson | H04N 19/597 |
| 10,051,286 B2* | 8/2018 | Grangetto | H04N 19/597 |
| 2002/0015048 A1* | 2/2002 | Nister | G06T 15/20 345/625 |
| 2002/0158873 A1* | 10/2002 | Williamson | G06T 15/20 345/427 |
| 2006/0071930 A1* | 4/2006 | Fujiwara | G06T 15/08 345/419 |
| 2009/0322859 A1* | 12/2009 | Shelton | G01B 11/2513 348/46 |
| 2010/0208994 A1* | 8/2010 | Yao | G06T 5/005 382/173 |
| 2010/0245535 A1* | 9/2010 | Mauchly | G06T 15/20 348/14.08 |
| 2011/0057930 A1 | 3/2011 | Keller et al. | |
| 2011/0298898 A1* | 12/2011 | Jung | H04N 13/0239 348/47 |
| 2012/0056982 A1* | 3/2012 | Katz | G06F 3/017 348/43 |
| 2012/0162395 A1* | 6/2012 | Ho | H04N 13/122 348/51 |
| 2013/0100256 A1 | 4/2013 | Kirk et al. | |
| 2013/0155050 A1* | 6/2013 | Rastogi | G06T 5/50 345/419 |
| 2013/0259315 A1 | 10/2013 | Angot et al. | |
| 2014/0192148 A1* | 7/2014 | Georgakis | H04N 19/597 348/42 |
| 2014/0362179 A1* | 12/2014 | Lee | G06T 7/593 348/43 |
| 2014/0376825 A1* | 12/2014 | Venkataraman | G06T 9/00 382/232 |
| 2015/0036014 A1* | 2/2015 | Lelescu | G06T 3/4076 348/218.1 |
| 2015/0085082 A1* | 3/2015 | Zierke | H04N 13/271 348/48 |
| 2015/0245062 A1* | 8/2015 | Shimizu | H04N 19/597 375/240.15 |
| 2015/0319421 A1* | 11/2015 | Chung | G06T 7/0075 348/46 |

FOREIGN PATENT DOCUMENTS

| | | | |
|---|---|---|---|
| JP | 2000105105 A | * | 4/2000 |
| WO | WO-2014099048 A2 | | 6/2014 |

OTHER PUBLICATIONS

Multi-view tof sensor fusion technique for high quality Depth Map, Kim et al., SPIE, 10.1117/12.2001733.*
Multiple Depth—Analysis, Meunier et al., IEEE, 978-1-4673-0382-8, 2012, pp. 478-483.*
Accuracy and resolution of kinect depth data—applications, Khoshelham at al., Sensors 2012, 10.3390, pp. 1437-1454.*
Multi-sensor—enviornment, Kitsikidis et al., Researchgate, Jun. 2014, pp. 1-12.*
Multi-sensor—enviornment, Kitsikidis et al., Researchgate, Jun. 2014, pp. 1-12 (Year: 2014).*
International Search Report and Written Opinion—PCT/US2016/012069—ISA/EPO—dated Mar. 22, 2016.
Menard C., et al., "Pictorial, Three-Dimensional Acquisition of Archeological Finds as Basis for an Automatic Classification," Analecta Praehistorica Leidensia, Institute Voor Prehistorie, Netherlands, Jan. 1, 1996, vol. 28 (2), pp. 419-432, XP008159610.
Pankanti S., et al., "Integrating Vision Modules: Stereo, Shading, Grouping, and Line Labeling," IEEE Transactions on Pattern Analysis and Machine Intelligence, Sep. 1, 1995, vol. 17 (8), pp. 831-842, XP000532206.
Ribera R.B., et al., "Dense Depth Map Acquisition System for 3DTV Applications Based on Active Stereo and Structured Light Integration," Dec. 15, 2009, Advances in Multimedia Information Processing—PCM, 2009, Springer Berlin Heidelberg, Berlin, Heidelberg, pp. 499-510, XP019134925.
Waschbüsch, et al., "Point-sampled 3D Video of Real-World Scenes," Signal Processing Image Communication Elsevier Science Publishers, Amsterdam, NL, Mar. 16, 2007, vol. 22 (2), pp. 203-216, XP005938669.
Williem, et al., "Accurate and Real-time Depth Video Acquisition using Kinect-Stereo Camera Fu," Optical Engineering, Apr. 1, 2014, vol. 53 (4), pp. 43110, XP060048453; Abstract.

* cited by examiner

METHOD AND APPARATUS FOR MULTIPLE TECHNOLOGY DEPTH MAP ACQUISITION AND FUSION

BACKGROUND

Field of the Invention

The present application relates generally to a generation of a depth map of a field of view (FOV) and, more specifically, to systems, methods, and devices for automatically generating a fused or aggregate depth map of the FOV that is configured to compensate for weaknesses that may be introduced by individually generated depth maps.

Description of the Related Art

Users often experience moments or events which they would like to capture, in photographs or video, and review at a later date and/or time, for example, a child's first steps or words, graduation, a scenic view, or a wedding. Often, these moments or events may be static and their occurrence generally predictable (e.g., a wedding, a graduation, a serene landscape, or a portrait) and may be fully captured at a specific depth by the user utilizing imaging equipment, for example, a camera, a video recorder, or a smartphone, etc. However, sometimes capturing scenes with objects or events at a specific depth at the right time may present a challenge, especially if the scene contains moving objects or if the camera is subjected to panning. For example, capturing a bird flying through a group of trees or capturing a child walking while the camera must pan with the child. This may be due, at least in part, to the difficulty the imaging equipment may have in generating a depth map of the FOV. A depth mapping system may be used to determine a relative depth of the target object and may be used to control any of a number of processes, for example auto focusing, object detection, face recognition, among others. Accordingly, difficulties in generating an accurate and reliable depth map may cause difficulties for the imaging device that uses the depth mapping system in its functions. Accordingly, systems and methods to facilitate the generation of depth map of a scene for use in imaging equipment would be beneficial.

SUMMARY

The systems, methods, and devices of the invention each have several aspects, no single one of which is solely responsible for its desirable attributes. The implementations disclosed herein each have several innovative aspects, no single one of which is solely responsible for the desirable attributes of the invention. Without limiting the scope of this invention as expressed by the claims which follow, some features will now be discussed briefly. After considering this discussion, and particularly after reading the section entitled "Detailed Description," one will understand how the features of the various embodiments of this invention provide advantages that include improved capture or identify target objects in a frame at a desired depth.

One aspect of the subject matter described in the disclosure provides an apparatus for generating a depth map. The apparatus comprises an image capture device (or imaging device) configured to sense and record an image of a field of view (FOV) of the image capture device. The image capture device includes at least one sensor configured to electronically record an image, comprising a plurality of pixels, representative of a scene in the FOV of the image capture device. Some embodiments may include more than one sensor. The apparatus (and methods described herein) may further comprise a plurality of "depth sensing modules," each of the depth sensing modules configured to generate a depth map of the field of view using certain processing techniques. Such depth sensing modules may be, for example, software modules, functionality implemented in hardware, or a combination of both. In other words, "depth sensing modules" as used herein may refer to functionality implemented in software, hardware, or both software and hardware, the performs actions to determine a depth information of at least a portion of the FOV of an image capture device. The depth information may include, for example, information indicating the distance from the sensor (or another part of the image capture device) to various objects, features or background in the FOV (or a portion thereof) of the image capture device. The image capture device may comprise components configured to generate the depth maps of the field of view for each of the plurality of depth sensing modules, or by connected to and/or in communication with such components. The apparatus also includes a processing system. The processing system is configured to select a first depth sensing module from the plurality of depth sensing modules and sense a first depth of the field of view of the imaging device using the first selected depth sensing module. The processing system is also configured to generate a first depth map of the field of view based on the first sensed depth of the first selected depth sensing module. The first depth map comprises a depth measurement for every point in the field of view and identifies a region of one or more points of the first depth map having one or more inaccurate depth measurements in the first depth map. The processing system is configured to determine if additional depth sensing via a second selected depth sensing module of the plurality of depth sensing modules is warranted based on the identification of the region having one or more points having one or more inaccurate depth measurements.

Another aspect of the subject matter described in the disclosure provides a method for generating a depth map. The method comprises identifying a field of view of an imaging device. The imaging device is configured to capture at least one image of the field of view. The method further comprises selecting a first depth sensing method from a plurality of depth sensing methods. The method also includes sensing a first depth of the field of view of the imaging device using the first selected depth sensing method and generating a first depth map of the at least one field of view based on the sensed depth of the first selected depth sensing method. The first depth map comprises a depth measurement for every point in the field of view. The method also comprises identifying a region of one or more points of the first depth map having one or more inaccurate depth measurements in the first depth map. The method further includes determining if additional depth sensing via a second selected depth sensing method is warranted based on the identification of the region having one or more points having one or more inaccurate depth measurements.

Another aspect of the subject matter described provides another apparatus for generating a depth map. The apparatus comprises means for capturing an image of a field of view. The apparatus further comprises a plurality of means for sensing depth, each of the plurality of depth sensing means configured to sense a depth of the field of view and means for selecting a first depth sensing means from the plurality of depth sensing means. The apparatus also includes means for sensing a first depth of the field of view of the image capturing means using the first selected depth sensing means and means for generating a first depth map of the field of view based on the sensed depth of the first selected depth sensing means, the first depth map comprising a depth measurement for every point in the field of view. The apparatus also comprises means for identifying a region of one or more points of the first depth map having one or more inaccurate depth measurements in the first depth map. The apparatus further includes means for determining if additional depth sensing via a second selected depth sensing means of the plurality of depth sensing means is warranted based on the identification of the region having one or more inaccurate depth measurements.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1A:
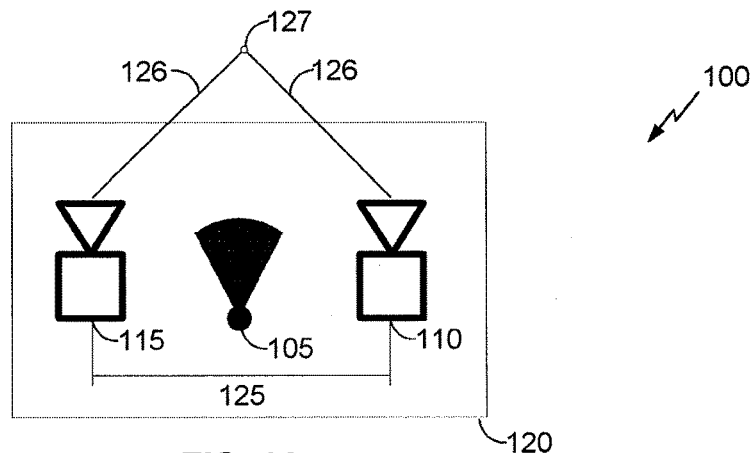
FIG. 1A illustrates a simplified block diagram of a stereo camera system configured to generate a depth map of an FOV of the image capture system, in accordance with an exemplary embodiment.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure may be thorough and complete, and may fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure defined by the appended claims and equivalents thereof.

In photography, a user may wish to capture images, in a field-of-view (FOV) of an imaging device, containing objects or events at various depths within the captured scene. Depending on the imaging equipment being used, one or more methods for determining a depth map (depth estimate) of a target object or scene or FOV may be used to enable features such as autofocusing, fore/background separation, face recognition or detection, 3D scanning, automatic indoor/outdoor location detection, object detection within a frame, and many other features. However, various systems for generating depth maps may have different disadvantages. For example, some systems may be computationally intensive or utilize complex algorithms. Some systems may utilize additional power to be supplied to various components used for generating the depth map, for example, multiple flash bulb components or multiple cameras or optics. Alternatively, multiple image capture systems may be required to generate the depth map, which may require additional computational throughput, or may require additional exposure time to the FOV. Accordingly, one or more of the available depth mapping systems may not be appropriate or available depending on the state or the environment of the imaging equipment.

When the user is actively monitoring an imaging equipment and manually controlling the imaging equipment, the user may be able to capture an image of the target object when the target object is at a desired depth in the field of view (FOV) or scene when the target object is in focus. However, even when manually controlling the imaging equipment, capturing the target object at the desired depth may be difficult when the scene contains multiple moving objects or if the imaging equipment is being panned (for example, moved to follow the target object or moved to detect the target object), or if the depth map generated by the default or selected depth mapping method is not entirely accurate. Additionally, it may be difficult for the user to determine the best depth mapping system to use for a given environment and subject matter, or the imaging equipment may generate poorly developed depth maps of the captured FOV. For example, the equipment may include closely spaced stereo optics, which may be unable to effectively and reliably provide a depth map for objects within the FOV at a considerable distance (for example, greater than 10 meters) from the imaging equipment.

When the user is not actively controlling the imaging equipment, for example, when the imaging equipment is set up to capture images automatically, the capture of the FOV using an accurate and reliable depth map may be further complicated, especially if the imaging equipment comprises a single depth mapping method or system. Unfortunately, the depth maps produced by the imaging equipment may comprise insufficient information for use by the autofocusing, fore/background separation, face detection/recognition, 3D scanning, object detection, location detection, and various other features of the automated imaging equipment. This may be due to the difficulty of a single depth mapping method or system to accurately and reliably determine the depth of the FOV in a variety of environments. Accurately and reliably determining the depth of the FOV may comprise being capable of generating a depth map for the FOV that indicates a correct depth for each object in the FOV. In some embodiments, an accurate and reliable depth map may indicate the correct depth for 75% of the objects in the FOV. In some embodiments, an accurate and reliable depth map may indicate the correct depth for 90% of the objects in the FOV. In some embodiments, the user may select and/or determine the percentage of correct depth measurements for objects within the FOV that will correspond to accurate and reliable depth maps. Accurate and reliable depth may be measured as being within 1 cm at a distance of 1 meter. In some embodiments, the user may select and/or determine the ranges and measures for accurate and reliable depths.

The accuracy and reliability of the different systems of generating depth maps may vary. For example, the closely-spaced stereo camera system having a depth mapping system configured to function within a 10'×10' indoor room with limited external lighting may not provide as accurate or reliable a depth map in an outdoor scene with the target object at a distance of 20 meters as a structured light depth mapping system configured for outdoor scenes. Thus, depending on the FOV, one or more of the different systems or methods of generating the depth map of the FOV may be more accurate and reliable than other systems or methods of generating the depth map of the FOV. Additionally, each of the different systems or methods of generating depth maps may have different disadvantages. For example, the disadvantage of the depth from shading system may be different than the disadvantage of the stereo camera system.

Given the inherent limitations and disadvantages of different methods that may be used for generating depth maps, various processes or configurations may be tried to improve the likelihood of capturing the target object at the desired depth. In some embodiments, in order to capture the image of the target object at the desired depth, the imaging equipment may be configured to capture multiple frames in succession (for example, implement a single-camera multi-shot, or burst of frame captures, mode). The imaging equipment may begin the multi-shot burst when the target object is close to the ideal depth as best as the depth mapping system of the imaging equipment can determine. However, such multi-shot implementations require significant overhead in memory and processing time and power to capture the multiple frames and store them in a memory for user review. Additionally, such multi-shot bursts cannot guarantee to capture the desired object or action at all. Alternatively, the target object may be captured in the frame but may not be captured at the desired depth. If the desired object or action is captured in a frame of the multi-shot burst at the desired depth, the multi-shot implementation may not properly focus on the target object, and instead focus on the background or another object in the frame, or may not focus on any object in the FOV, especially if the target object is in motion and/or if the imaging equipment is in motion. In addition to the technical difficulties that may exist in the system having a single depth mapping system, the user and/or the imaging equipment expends time to review the captured frames and determine which frame, if any, captured the target object at the desired depth and properly in focus of all the captured frames of the multi-shot burst.

In some embodiments, the imaging equipment may comprise multiple systems for generating individual depth maps. For example, the imaging equipment my comprise a system capable of stereo vision depth mapping, a system capable of structured light depth mapping, and a system capable of depth from shading depth mapping, among others. Additionally, the imaging equipment may comprise a fusing system configured to dynamically fuse the individual depth maps into a combined depth map that may provide a single fused depth map with a maximum number of accurate and reliable regions. The fused depth map may overcome the limitations of any of the single depth maps. When being fused into a single depth map, each individual depth map may be optimized for scenarios and uses where the other depth maps may fail or may be inaccurate or unreliable (or less accurate or less reliable), thus allowing each individual depth map to be used according to its strengths and ignoring its weaknesses.

Accordingly, the imaging equipment may comprise the components or equipment necessary to generate a plurality of depth maps of the FOV. For example, as described above, the components to generate a depth map using stereo vision may include two imaging sensors (or cameras or optics) and a single light source, the components to generate a depth map using shading may include two light sources and a single imaging sensor, and the components to generate, a depth map using structured light may include a single structured light source and a single imaging sensor. In addition to the light sources and the imaging sensors, each of the individual systems for generating depth maps may comprise individual processing systems and circuitry configured to measure depth for each point in the captured FOV or scene and to generate the associated depth maps from the data captured by the imaging sensor(s), though in some embodiments, the plurality of depth mapping systems may share processing systems and circuitry.

FIG. 1A provides an illustration of an exemplary block diagram of a stereo camera system 100 that may be used to generate a depth map of a field of view of the image capture system, in accordance with an exemplary embodiment. As shown in FIG. 1A, the stereo camera system 100 may comprise a plurality of components. The plurality of components comprises a single light source 105, a first camera 110, and a second camera 115. In some embodiments, a single enclosure, as represented by enclosure 120, may house each of the light source 105, the first camera 110, and the second camera 115. In some embodiments, the light source 105, the first camera 110, and the second camera 115 may be housed in more than one enclosure, where one or more of the components are spaced apart from one or more other components of the stereo camera system 100. The first camera 110 and the second camera 115 are shown having focus lines 126 to a point 127. These focus lines may represent different points of fixation for the first and second cameras 110 and 115. Additionally, a distance 125 is shown between the two first and second cameras 110 and 115. The distance 125 may impact the range of the depth calculation or mapping of the stereo camera. For example, if the first and second cameras 110 and 115 are closely spaced, then the perceived depth of objects within frames captured by both the first and second cameras will be more limited (for example, the perceived depth will not be as far) than when the distance 125 between the first camera 110 and the second camera 115 is large.

Viewing an object or edge from different vantage points may make the object or edge appear to be in different locations. For example, when the first camera 110 views the point 135, the point 135 may appear to be in a different location than the same point 135 viewed by the second camera 115 at the same time. This is because the first camera 110 and the second camera 115 are in different (or disparate) locations. Accordingly, depending on the first and second cameras 110 and 115, the target object may be shifted slightly in one direction in relation to the position of the first and second cameras 110 and 115, respectively. By using the distance 125 between the first camera 110 and the second camera 115 and an observed disparity of the resultant image of the point 135 in the first and second cameras 110 and 115, respectively, the stereo camera system 100 may be capable of generating a depth map of the objects in the field of view shared by the first and second cameras 110 and 115. This method may be applied to all points in the FOV or scene of the first and second cameras 110 and 115, wherein the point 135 is placed at all points in the FOV or scene.

Though not shown in this figure, the stereo camera system 100 may further comprise one or more processing components configured to control the light source 105, the first camera 110, and the second camera 115 to capture an image and/or generate a depth map. In some embodiments, these one or more components may comprise a controller or a processor. The controller or processor may be configured to control the one or more components of the stereo camera system (i.e., activate the light source 105 and the first and second cameras 110 and 115 to capture images of the field of view) and process the images generated by the first and second cameras 110 and 115, respectively, to generate a depth map of the FOV shared between the first and second cameras 110 and 115. In some embodiments, the one or more processing components may also include a memory (not shown in this figure) for storage of the generated depth map.

Depth sensing using the stereo camera system 100 may prove beneficial for many reasons. For example, the stereo camera system 100 may be configured to generate a depth map of the FOV either actively or passively. Additionally, in some embodiments, the stereo camera system 100 may generally have good accuracy and often may comprise a range capable of determining depth of target objects in the FOV closely spaced to the stereo camera system 100 to those target objects in the FOV spaced at an infinite distance from the stereo camera system 100. However, the stereo camera system 100 may have a few negative aspects with regard to generating accurate and reliable depth maps of the observed FOV. In some embodiments, a determination of the good accuracy may correspond to the distance of the target object from the stereo camera system 100, where, as the distance increase, the error increases. Also, in some embodiments, the determination of the good accuracy may depend on the use of the stereo camera system 100. For example, when used for more secure purposes, such as identification, greater accuracy may be required than when used for less secure purposes, for example, motion detection, etc.

As described above, in some embodiments, the distance 125 between the first camera 110 and the second camera 115 may impact the perceived depth of an object viewed by both cameras 110 and 115. Accordingly, the perceived depth of the objects in the FOV may influence the ability for the processing component(s) to accurately and reliably generate the depth map for the FOV from the images captured by the first and second cameras 110 and 115. Thus, the depth map generated by the stereo camera system 100 may be susceptible (that is, may be less accurate and/or less reliable) when the first and second cameras 110 and 115 are closely spaced (for example, distance 125 is small (e.g., a few millimeters apart)) or when the first and second cameras 110 and 115 are spaced far apart (for example, the distance 125 is larger (e.g., a few inches or more)) in the stereo camera system 100. One potential negative regarding the stereo camera depth sensing method is that the stereo camera uses focus points in the FOV at which both of the first and second cameras 110 and 115 are pointed and focused. Without these scene dependent "key points," the two cameras 110 and 115 may be unable to determine the depth of objects in the FOV because the images obtained from the first camera 110 and the second camera 115 individually may not correspond to the same target object or location in the FOV.

Figure 1B:
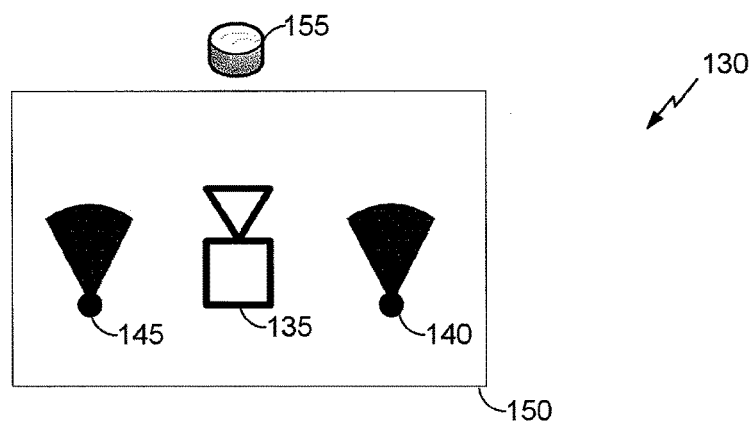
FIG. 1B illustrates a simplified block diagram of an image capture system configured to generate a depth map of an FOV of the image capture system using a depth from shading system, in accordance with an exemplary embodiment.

FIG. 1B provides an illustration of an exemplary block diagram of a depth from shading system 130 that may be used to generate a depth map of a field of view (FOV) of the system, in accordance with an exemplary embodiment. As shown in FIG. 1B, the depth from shading system 130 may comprise a plurality of components. The plurality of components comprises a first light source 140, a second light source 145, and a camera 135. In some embodiments, a single enclosure, as represented by enclosure 150, may house each of the first light source 140, the second light source 145, and the camera 135. In some embodiments, the first light source 140, the second light source 145, and the camera 135 may be housed in more than one enclosure, where one or more of the components are spaced apart from one or more other components of the depth from shading system 130. The first light source 140 and the second light source 145 are shown generating light that may be reflected off an object 155. The camera 135 may absorb the light that reflects off the object 155. The intensity of the light reflected off the object 155 may vary based on the shape of the surface off which the light reflects back to the image sensor 135. Thus, the changes in the intensity of the reflected light may be used to determine shape information of the surface of the object 155 by which the light was reflected.

The shape information of the surface of the object 155 may be determined by calculating an orientation of the surface corresponding to each point on the object 155. The depth from shading system 130 may use the intensity of the light reflected from each point on the object 155 to determine the normal of the surface of the object 155 at that point (the direction that point of the object 155 is facing). The normal of the surface of the object 155 may be used to then reconstruct the object 155. However, the depth from the shading system 130 may assume the surface of the object 155 is smooth, where contours of the surface may increase difficulty in reconstructing the object 155.

Though not shown in this figure, the depth from shading system 130 may further comprise one or more processing components configured to control the first light source 140, the second light source 145, and the camera 135 to capture an image and/or generate a depth map. In some embodiments, these one or more components may comprise a controller or a processor. The controller or processor may be configured to control the one or more components of the depth from shading system 130. This may comprise activating the first and second light sources 140 and 145, respectively, to illuminate the object 155 and activating the camera 135 to capture images of the field of view. The controller or processor may further be configured to process the images generated by the camera 135 and to generate an indirect depth map of the FOV based on the reconstructed object 155 (for example, based on calculations of the light off of the surface of the object 155). In some embodiments, the one or more processing components may also include a memory (not shown in this figure) for storage of the generated depth map.

Depth sensing using the depth from shading system 130 may prove beneficial for many reasons. For example, the depth from shading system 130 may not use key points within the FOV of the shading system 130, thus making the depth from shading system 130 independent of the FOV being captured. Additionally, the depth from shading system 130 may be configured to generate a depth map of the FOV actively. However, the depth from shading system 130 may have a few more negative aspects with regard to generating accurate and reliable depth maps for a broad range of distances of the observed FOV. For example, while, in some embodiments, the stereo camera system 100 may generally have good accuracy (for example, having an error of less than a centimeter at a distance of a meter) and often may comprise a range capable of determining depth of target objects in the FOV closely spaced to the stereo camera system 100 to those target objects in the FOV spaced at a near infinite distance from the stereo camera system 100, the shading system 130 may be limited to target objects near the shading system 130 to a distance far from the shading system 130 but may not have the infinite range of the stereo camera system 100. As described above, in some embodiments, the surface of the object 155 may impact the depth sensing of the depth from shading sensing because the texture of the surface may change the reflective properties of the surface of the object 155 back to the camera 135, thus impacting the perceived depth of the surface of the object 155. Accordingly, the perceived depth of the object 155 in the FOV may impact the ability for the processing component to accurately and reliably generate the depth map for the FOV based on the light reflected by the object 155 and captured by the camera 135. Additionally, as discussed above, the accuracy of the depth map generated from the depth from shading system 130 may be only "Ok" as compared to the depth map generated by the stereo camera system 100. Also, the depth from shading system may be susceptible to bright external light being present in the FOV or scene.

Figure 1C:
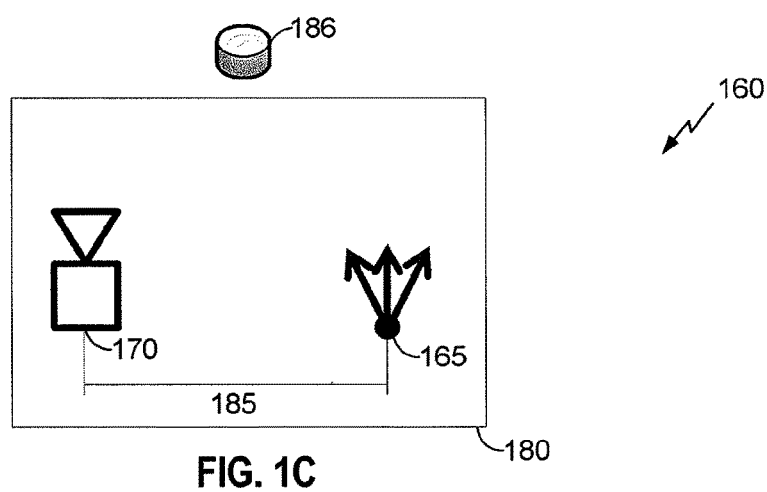
FIG. 1C illustrates a simplified block diagram of an image capture system configured to generate a depth map of an FOV of the image capture system using a structured light system, in accordance with an exemplary embodiment.

FIG. 1C provides an illustration of an exemplary block diagram of a structured light sensing system 160 that may be used to generate a depth map of a field of view (FOV) of the system, in accordance with an exemplary embodiment. As shown in FIG. 1C, the structured light sensing system 160 may comprise a plurality of components. The plurality of components comprises a structured light source 165 and a camera 170. In some embodiments, a single enclosure, as represented by enclosure 180 may house both the structured light source 165 and the camera 170. In some embodiments, the structured light source 165 and the camera 170 may be housed in more than one enclosure, where the structured light source 165 and the camera 170 are spaced apart from each other. As shown in the FIG. 1C, the structured light source 165 and the camera 170 may be separated by a distance 185. The structured light source 165 is shown generating light that may be reflected off an object 186. The light generated by the structured light source 165 may be of a known pattern. The camera 170 may absorb the light that reflects off the object 186. The way that the known pattern of light reflects or deforms when reflecting or striking surfaces allows the camera 170 to calculate the depth and surface information of the objects in the scene or FOV. Thus, the reflections may be used to determine depth information of the object 186. Various types of structured light systems 160 may exist, for example light planes, gray-code patterns, and series of sine waves.

Though not shown in this figure, the structured light system 160 may further comprise one or more processing components configured to control the structured light source 165 and the camera 170 to capture an image and/or generate a depth map. In some embodiments, these one or more components may comprise a controller or a processor. The controller or processor may be configured to control the one or more components of the structured light system 160. This may comprise activating the structured light source 165 to generate and illuminate the object 186 with the known light pattern and activating the camera 170 to capture images of the field of view. The controller or processor may further be configured to process the images generated by the camera 170 and to generate a depth map of the FOV based on the calculations of the light reflected off the surface of the object 186 and any object in the FOV or scene. In some embodiments, the one or more processing components may also include a memory (not shown in this figure) for storage of the generated depth map.

Depth sensing using the structured light system 160 may prove beneficial for many reasons. For example, like the depth from shading system 130, the structured light system 160 may not use key points within the FOV or scene, thus making the structured light system 160 independent of the FOV being captured. Additionally, the structured light system 160 may be configured to generate a depth map of the FOV actively. Also, the depth map generated by the structured light system 160 may have good accuracy and reliability. However, the structured light system 160 may have a few negative aspects with regard to generating accurate and reliable depth maps for a broad range of distances of the observed FOV. In some embodiments, movement of the object 186 or the camera 170 may disrupt the ability for the structured light system to detect the known pattern of light to reflect off the object 186. Additionally, the structured light system 160 may have a limited range, thus affecting the perceived depth of the object 186. Accordingly, the perceived depth of the object 186 in the FOV may affect the ability for the processing component to generate accurate and reliable depth maps for the FOV. Also, the structured light system may be susceptible to bright external light being present in the FOV or scene.

The depth mapping systems described herein are intended to be exemplary and are not limiting on the depth mapping systems covered by this invention. Additional depth mapping systems may be incorporated into a system or method to generate a fused depth map having minimal areas or regions of inaccurate or unreliable depth.

Figure 2:
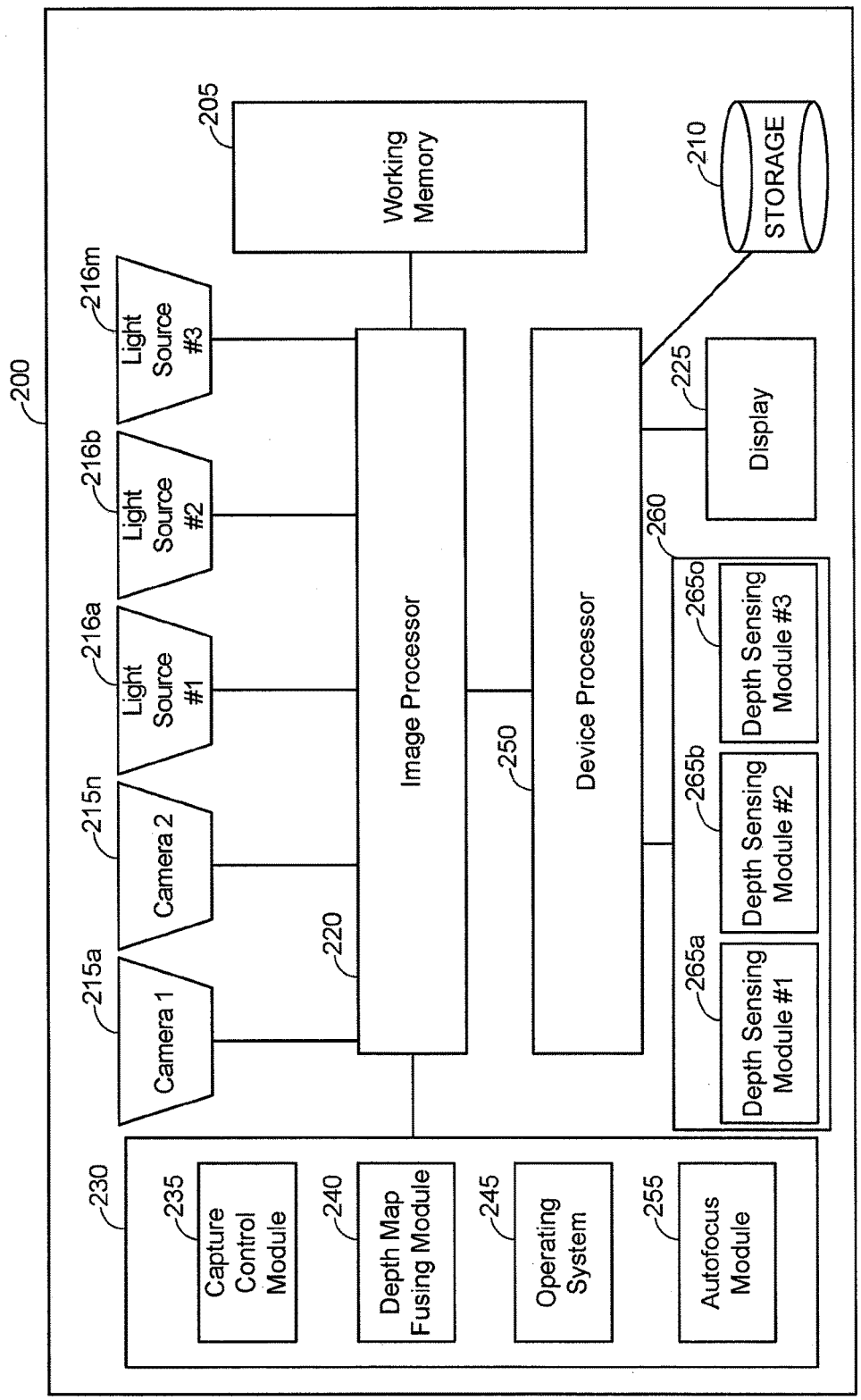
FIG. 2 illustrates a block diagram of one embodiment of an image capture device that may be used to generate independent or fused depth maps, in accordance with an exemplary embodiment, for the use cases described herein.

FIG. 2 illustrates a high-level block diagram of one possible embodiment of an image capture device 200 having a set of components including an image processor 220 linked to a plurality of cameras or optics 215a-215n and to a plurality of light sources 216a-216m. The image processor 220 may also be in communication with a working memory 205, memory 230, and device processor 250, which in turn may be in communication with electronic storage module 210, an electronic display 225, and a depth sensing system 260. In some embodiments, a single processor may comprise both the image processor 220 and the device processor 250 instead of two separate processors as illustrated in FIG. 2. Some embodiments may include three or more processors. In some embodiments, some of the components described above may not be included in the image capture device 200 or additional components not described above may be included in the image capture device 200. In some embodiments, one or more of the components described above or described as being included in the image capture device 200 may be combined or integrated into any other component of the image capture device 200.

The image capture device 200 may be, or may be part of, a cell phone, digital camera, tablet computer, personal digital assistant, or the like. There are many portable computing devices where a depth map fusing system as described herein would prove advantageous. Image capture device 200 may also be a stationary computing device or any device in which a depth map fusing system would be advantageous. A plurality of applications may be available to the user on image capture device 200. These applications may include traditional photographic and video applications, high dynamic range imaging, panoramic photo and video, or stereoscopic imaging such as 3D images or 3D video.

The image capture device 200 includes the cameras or optics 215a-215n for capturing external images. Each camera or optics 215 may include at least one sensor, at least one optical imaging component that focuses light received from the FOV of the image capture device 200 to the at least one sensor (for example, a lens system), and/or an autofocus assembly coupled to the at least one optical imaging component. In general, N cameras 215a-215n may be used, where N≥1. However, some embodiments may employ only one image sensor assembly, and it will be understood that cameras or optics 215a-215n may comprise any number of image sensor assemblies suitable for an implementation of the depth map fusing system described herein. The number of cameras or optics may be increased to achieve greater depth determining capabilities of a given field of view. The cameras or optics 215a-215n may be coupled to the image processor 220 to transmit a captured image to the image processor 220. The images captured by the cameras or optics 215a-215n may be illuminated by light sources 216a-216m. The light sources 216a-216m may include a flash bulb, a reflector, and a geometric light pattern generator, among others. In general, M light sources 216a-216m may be used, where M≥2. The image processor 220 or the device processor 250 may be configured to receive the captured image(s) and determine the depth of the scene or FOV captured therein accordingly. In some embodiments, the cameras or optics 215 may capture "preliminary" images that are used to generate a depth map of the scene or FOV. In some embodiments, the camera or optics 215a-215n and the processing equipment coupled thereto may not capture images to determine the depth of the objects but may rather generate the depth map of the FOV from a "live" view without actually capturing an image.

The image processor 220 may be configured to perform various processing operations on received image data comprising portions of the target image in order to output a high quality image. Processor 220 may be a general-purpose processing unit or a processor specially designed for imaging applications. Examples of image processing operations include depth mapping, depth matching, depth determination operations, or depth map fusing operations. These operations may be performed by the same or different processor that performs cropping, scaling (e.g., to a different resolution), image stitching, image format conversion, color interpolation, color processing, image filtering (e.g., spatial image filtering), lens artifact or defect correction, lens light roll-off or reduction of light level caused by vignette, and the like. Processor 220 may comprise, in some embodiments, a plurality of processors. Certain embodiments may have a processor dedicated to each image sensor. Image processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, depth map fusing module 240, operating system 245, and autofocus module 255. Additional modules may be included in some embodiments, or fewer modules may be included in some embodiments. These modules include instructions that configure the image processor 220 of device 200 to perform various image processing and device management tasks. Working memory 205 may be used by image processor 220 to store a working set of processor instructions contained in the modules of memory 230. Alternatively, working memory 205 may also be used by image processor 220 to store dynamic data created during the operation of device 200 (e.g., one or more depth maps to be fused into a single fused depth map). While additional modules or connections to external devices or hardware may not be shown in this figure, they may exist to provide other depth-triggered options or actions.

As mentioned above, the image processor 220 may be configured by several modules stored in the memory 230. The capture control module 235 may include instructions that control the overall image capture functions and depth determining functions of the device 200. For example, capture control module 235 may include instructions that configure the image processor 220 to capture raw image data of a target image scene using the cameras/optics 215a-215n. Capture control module 235 may then call the depth-fusing module 240 to fuse multiple depth maps together.

Depth map fusing module 240 may comprise instructions that allow the image processor 220 or the device processor 250 to fuse or combine multiple depth maps into a single, spatially dependent depth map. Each of the points of the fused depth map may comprise the most reliable and accurate depth information from the multiple depth sensing modules 265a-265o. The spatial dependency may comprise ensuring that the depth map-fusing module 240 configures the image processor 220 to replace an inaccurate or unreliable portion of one depth map with an accurate and reliable portion of another depth map that corresponds to the same physical location in the FOV of the depth map. For example, the depth map-fusing module 240 may configure the image processor 220 to fuse a depth map generated by a stereo camera system with a depth map generated by a depth from shading system. The resulting fused depth map may benefit from the advantages of each depth map (good accuracy from the stereo camera depth map and no need for key points from the shading depth map), while avoiding the disadvantages of the two individual depth maps. Accordingly, the FOVs or the scenes mapped by each of the depth maps may be substantially the same or comprise substantially the same objects for the fused depth map to be spatially dependent, as described above.

Operating system module 245 configures the image processor 220 to manage the working memory 205 and the processing resources of device 200. For example, operating system module 245 may include device drivers to manage hardware resources such as the cameras 215a-215n. Therefore, in some embodiments, instructions contained in the image processing modules discussed above may not interact with these hardware resources directly, but instead interact through standard subroutines or APIs located in operating system component 245. Instructions within operating system 245 may then interact directly with these hardware components. Operating system module 245 may further configure the image processor 220 to share information with device processor 250.

Autofocus module 255 can include instructions that configure the image processor 220 to adjust the focus position of each of cameras 215a-215n, for example by controlling the movement and positioning of corresponding autofocus assemblies. Autofocus module 255 can include instructions that configure the image processor 220 to perform focus analyses and automatically determine focus parameters in some embodiments, and can include instructions that configure the image processor 220 to respond to user-input focus commands in some embodiments. In some embodiments, the autofocus module 255 may use information from the fused depth map generated by the depth map-fusing module 240 to determine when a target object in the FOV is at a specific depth and appropriate focus on the target object. In some embodiments, the lens system of each camera in the array can be focused separately. In some embodiments, the lens system of each camera in the array can be focused as a group. In some embodiments, the autofocus module 255 may be configured to receive a command from the depth map-fusing module 240 or from one of the processors 220 or 250.

Device processor 250 may be configured to control the display 225 to display the captured image, or a preview of the captured image, to a user. The display 225 may be external to the imaging device 200 or may be part of the imaging device 200. The display 225 may also be configured to provide a viewfinder displaying a preview image for a user prior to capturing an image, or may be configured to display a captured image stored in memory or recently captured by the user. The display 225 may include a panel display, for example, a LCD screen, LED screen, or other display technologies, and may implement touch sensitive technologies. The device processor 250 may also be configured to receive an input from the user. For example, the display 225 may also be configured to be a touchscreen, and thus may be configured to receive an input from the user. The user may use the touchscreen display 225 to input information that the processor may provide to the depth map-fusing module 240. For example, the user may use the touchscreen to select a target object from the field of view shown on the display 225 or establish a minimum accuracy or reliability for the fused depth map. The device processor 250 may receive that input and provide it to the depth map-fusing module 240, which may use the input to select depth maps for fusing operations or may select specific depth mapping methods for use in the scene or FOV.

In some embodiments, the device processor 250 may be configured to control the depth sensing system 260 or to receive inputs from the depth sensing system 260. The depth sensing system 260 may be configured to determine which one or more depth sensing module 265a-265o to use to generate a depth map of a particular FOV or scene of the image capture device 200. For example, the depth sensing system 260 may evaluate the working memory 205 available and/or the battery or power available and use that information to determine which of the depth sensing modules 265a-265o may be most appropriate for the given conditions at a moment in time. Additionally, the depth sensing system 260 may evaluate a "live" view from the cameras or optics 215a-215n to determine which depth sensing module 265a-265o is best suited for the environment or the scene or FOV for which a depth map is to be generated. In some embodiments, the depth sensing system 260 may view previously captured frames of the FOV or scene to evaluate or determine which depth sensing module 265a-265o to user for the FOV or scene in subsequent depth maps.

In some embodiments, the device processor 250 or the depth sensing system 260 may select multiple depth sensing modules 265a-265o and may determine to use the depth map-fusing module 240 to generate a single fused depth map from the individual depth maps generated by the selected depth sensing modules 265a-265o. The selection of the multiple depth sensing modules 265a-265o may be based on one or more of the environment or the scene or FOV of the image capture device 200, one or more parameters of the image capture device. In general, O depth sensing modules 265a-265o may be used, where O≥2. In some embodiments, the depth sensing module 265a may comprise the stereo camera system 100, the depth sensing module 265b may comprise the depth from shading system 130, and the depth sensing module 265c may comprise the structured light system 160.

Device processor 250 may write data to storage module 210, for example data representing captured images. While storage module 210 is represented graphically as a traditional disk device, in some embodiments, the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, in some embodiments these separate components may be combined in a variety of ways to achieve particular design objectives. For example, in an alternative embodiment, the memory components may be combined with processor components to save cost and improve performance.

Additionally, although FIG. 2 illustrates a number of memory components, including memory component 230 comprising several modules and a separate memory 205 comprising a working memory, in some embodiments, different memory architectures may be utilized. For example, a design may utilize ROM or static RAM memory for the storage of processor instructions implementing the modules contained in memory 230. The processor instructions may be loaded into RAM to facilitate execution by the image processor 220. For example, working memory 205 may comprise RAM memory, with instructions loaded into working memory 205 before execution by the image processor 220. In some embodiments, the depth sensing system 260 may be software stored in memory 230 or may be a hardware system combined with the software components.

Figure 3:
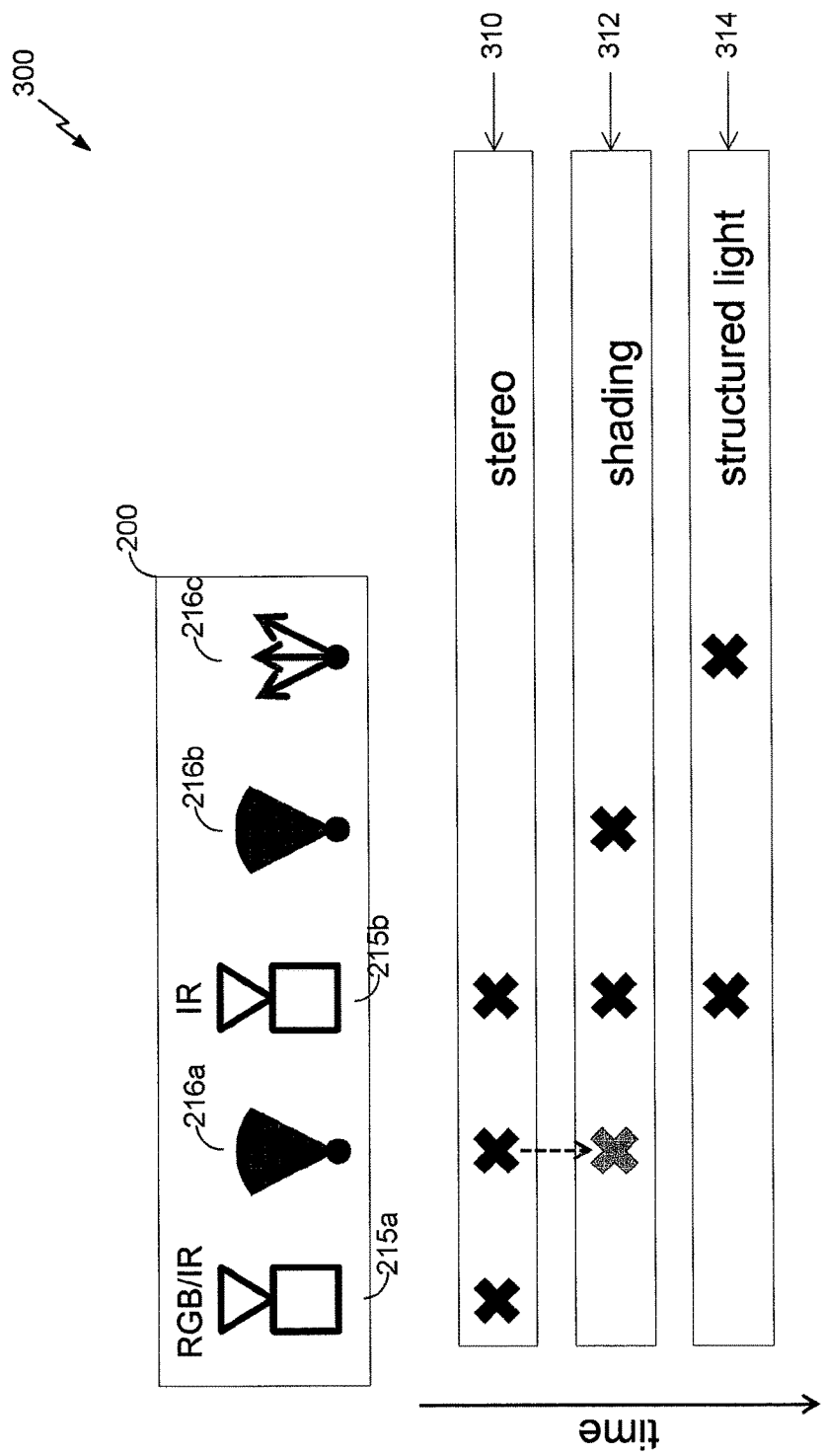
FIG. 3 illustrates a chart depicting components of the image capture device of FIG. 2 as they may be used for generating one or more depth maps using at least one of stereo camera, depth from shading, or structured light systems, in accordance with an exemplary embodiment.

FIG. 3 illustrates a chart 300 depicting components of the image capture device 200 of FIG. 2 as they may be used for generating one or more depth maps using at least one of stereo optics, shading, or structured light techniques, in accordance with an exemplary embodiment. The chart 300 in FIG. 3 comprises the various components of the image capture device 200 of FIG. 2, including the first camera 215a, the first light source 216a, the second camera 215b, the second light source 216b, and the third light source 216c, along the top row of the chart. In some embodiments, one or more of the cameras 215a or 215b may comprise a red/green/blue camera (RGB camera) or an infrared camera (IR camera) or a combination RGB/IR camera. In some embodiments, one or more of the light sources 216a-216c may comprise a structured light source, wherein the structured light source generates and emits a light having a known pattern (for example, a geometric or a time elapsed pattern). The vertical axis of the chart 300 comprises time (progressing down the page) and the three exemplary depth mapping systems stereo camera system 100, the depth from shading system 130, and the structured light system 160.

The chart 300 also shows which components of the image capture device 200 may be used by each of the depth mapping systems. For example, as shown in row 310, for the stereo camera system, the first camera 215a, the first light source 216a, and the second camera 215b may be used to measure the depth of all points in the FOV or scene to be captured by the image capture device 200 and generate a depth map for the FOV or scene. For the depth by shading system shown in row 312, the first light source 216a, the second camera 215b, and the second light source 216b may be used to measure the depth of all points in the FOV or scene and generate a depth map for the FOV or scene. Similarly, for the structured light system of row 314, the second camera 215b and the third light source 216c may be used to measure the depth of all points in the FOV or scene and generate a depth map for the FOV or scene.

The time element of the chart indicates the process that the image capture device 200 may utilize in accordance with an exemplary embodiment of this invention. As discussed above, one or more of the stereo camera system, the depth from shading system, and the structured light system, among any other depth mapping systems, may comprise disadvantages or may introduce inaccuracies or unreliability into the generated depth maps for the FOV or scene. Accordingly, using the systems, methods, and apparatus described herein, more than one depth map may be generated using more than one depth mapping system, and the individually generated depth maps may be fused into a single, spatially dependent depth map.

The fused depth map may be generated by combining the accurate and reliable points of a first depth map generated by a first depth mapping system and with the accurate and reliable points of a second depth map generated by a second depth mapping system. In some embodiments, the first depth mapping system may be selected based on the FOV or scene to be captured by the image capture device 200 or one or more parameters of the image capture device. 200. For example, if the image capture device 200 or one or more objects in the target FOV or scene are moving, the stereo camera system 100 may be selected to be first depth mapping system over the depth from shading system 130 or the structured light system 160, because the stereo camera system 100 may be capable of generating the most complete and accurate depth map of an FOV or scene in motion. In some embodiments, if the image capture device 200 is lacking working memory or the ability to store multiple images on a temporary basis, then the depth from shading system 130 may be selected as the first depth mapping system over the stereo capture system 100 and the structured light system 160. After the first depth map is generated from the information and measurements generated by the first depth mapping system, the image capture device 200 may determine the need to generate a second depth map to fuse with the first generated depth map. In some embodiments, when the image capture device 200 determines a second depth map is needed, the second depth mapping system may be selected from the remaining available depth mapping systems. The second depth mapping system may be selected based on an awareness or identification of the deficiencies (that is, the inaccurate and unreliable portions of the first depth map). Thus, the second depth map may be selected with the intention of filling in the inaccurate or unreliable depth measurements of the first depth map. If the image capture device 200 determines that an additional depth map is not necessary, then the image capture device 200 may not generate a second depth map. Accordingly, the image capture device 200 may generate the most complete and accurate depth map with minimal demand on the image capture device 200.

As mentioned above, the image capture device 200 may select one of the depth mapping systems based on the scene or FOV to be captured. For example, when the FOV or scene comprises good texture, then the stereo camera system 100 may be used in either a passive (or low power) mode or an active (or higher power) mode to generate the first depth map, dependent on how well the FOV or scene is lit without the light source of the image capture device 200. Additionally, the stereo camera system 100 may be used when there is a bright external light or in an outdoor setting. In some embodiments, when the FOV or scene comprises little texture, the stereo camera system 100 may have difficulty obtaining depth measurements, and the first depth map generated by the stereo camera system 100 may be fused with a second depth map generated from one of the depth from shading system 130 or the structured light system 160. When the FOV or the scene comprises no texture or only flat areas, then either the depth from shading system 130 or the structured light system 160 may be selected to generate the first depth map. When objects in the FOV or scene are at a medium distance (for example, 0.5 m to 5 meters) at a low light level, the structured light system 160 may be used to generate the first depth map. However, when objects in the FOV or scene are at infinity in the FOV or scene, the stereo camera system 100 or the depth from shading system 130 may be used to generate the first depth map. A small distance may be 0 m to 0.5 m and infinity may be any distance above 10 m.

As also mentioned above, the image capture device 200 may select one of the depth mapping systems based on one or more parameters of the image capture device 200. For example, when battery capacity or power are to be conserved, the image capture device 200 may select the stereo camera system 100 as it consumes less power than either the depth from shading system 130 or the structured light system 160. However, as mentioned above, when memory is at a premium the image capture device 200 may select one of the depth from shading system 130 or the structured light system 160. Additionally, the depth from shading system 130 may require the least exposure time in the FOV or scene, such that the depth from shading system 130 may be most appropriate when the static image to be captured may be short lived. Additionally, the image capture device 200 may select one of the depth mapping systems based on the desired depth resolution. In some embodiments, the one or more parameters of the image capture device 200 may be considered in view of the FOV or scene to be captured.

In some embodiments, the user of the image capture device 200 may select the depth mapping system to use at a given moment based on an evaluation of the parameters and scene or FOV characteristics listed above. In some embodiments, the image capture device 200 may automatically select the depth mapping system to use based on its analysis of the parameters and scene or FOV characteristics listed above. Additionally, in some embodiments, the image capture device 200 may be configured to automatically revise a selection of depth mapping systems based on content of a previously captured scene or FOV, such that the selection of depth mapping systems may be dynamic.

Figure 4:
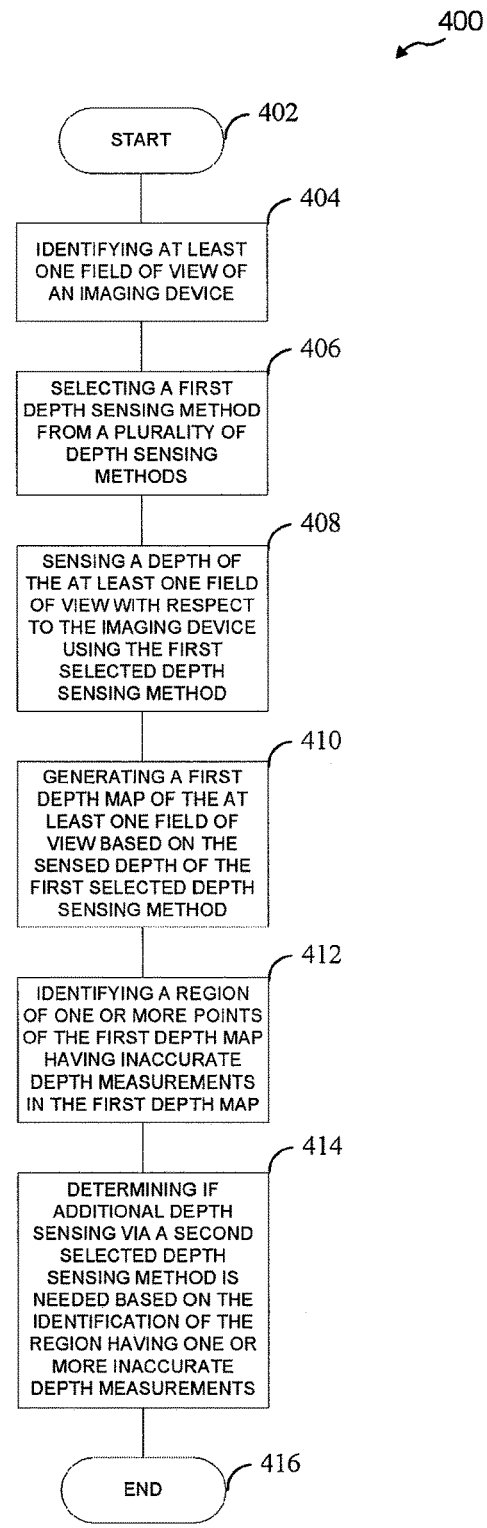
FIG. 4 illustrates a flow chart embodying an exemplary method for generating a depth map and fusing it with an additional depth map as necessary, in accordance with an exemplary embodiment.

FIG. 4 illustrates a flow chart embodying an exemplary method for generating a depth map and fusing it with an additional depth map as necessary, in accordance with an exemplary embodiment. The method 400 of FIG. 4 may be implemented by any imaging device or any other electronic device comprising the imaging equipment capable of generating depth maps of the FOV or scene of the device. In some embodiments, as described above, the imaging device or other electronic device may comprise a plurality of depth mapping systems comprising a stereo optic camera system, a structured light camera system, and/or a depth from shading camera system, or any other type of camera system capable of generating a depth map of the FOV or the scene of the imaging device. The method 400 may start at block 402. The start block 402 proceeds to the block 404 of the method 400, comprising identifying at least one field of view of an imaging device. The identified field of view of the imaging device may comprise the scene that may be captured by the imaging device or the view that may be seen by the imaging device. In some embodiments, identifying the field of view may comprise repositioning the imaging device such that a desired scene or object is within the frame that the imaging device can capture. In some embodiments, the at least one field of view may be identified automatically by the imaging device performing the method 400 or may be identified by the user. After the at least one field of view is identified, the method 400 proceeds to block 406.

Block 406 comprises selecting a first depth sensing method from a plurality of depth sensing methods. In some embodiments, the selecting the first depth sensing method from the plurality of depth sensing methods may be performed by the user of the imaging device. In some embodiments, the selecting may be performed automatically by the imaging device itself. In some embodiments, the selecting may be performed based on a determination that one or more of the depth sensing methods generates a more reliable and accurate depth map than another of the depth sensing methods. In some embodiments, the selecting may be performed based on one or more parameters of the imaging device, for example, available memory, available power, sensitivity, or the threshold depth level. In some embodiments, the selecting may be performed based at least in part on a depth of the at least one object, an environment of the at least one object, a location within the frame of the at least one object, or a characteristic of the imaging device. After the first depth sensing method is selected, the method 400 proceeds to block 408.

Block 408 comprises sensing a depth of the at least one field of view with respect to the imaging device using the first selecting depth sensing method. Sensing the depth of the at least one field of view may comprise using the stereo camera system to measure the depth of the scene captured by the imaging device. In some embodiments, sensing the depth may comprise using the depth from shading system or the structured light system. In some embodiments, the sensing comprises applying a disparity matching to the identified at least one field of view and wherein the imaging devices comprises stereo optics. In some embodiments, the sensing a depth may comprise measuring a depth, wherein the depth of each point of the field of view or scene is measured. After the depth of the field of view is sensed using the first selected depth sensing method, the method proceeds to block 410.

Block 410 comprises generating a first depth map of the at least one field of view based on the sensed depth of the first selected depth sensing method. Generating the first depth map may comprise compiling the sensed or measured depths of each point of the field of view or scene into a single map of the entire field of view or scene, where all the depths are in the single depth map. After the first depth map is generated, the method 400 progresses to block 412.

Block 412 comprises identifying a region of one or more points of the first depth map having inaccurate depth measurements. In some embodiments, a controller or other processor may analyze the first depth map and determine that the depth measurements of one or more points of the depth map are not accurate or are not reliable. The determination of lack of reliability or inaccuracy may be made based at least in part on the depth sensing method selected in block 406. In some embodiments, the determination may be made based on a comparison of the depth map with known depth measurements of points in the scene. In some embodiments, depth measurements may be determined to be inaccurate by determining whether of not depths are within certain thresholds. In some embodiments, depth measurements may be determined to be inaccurate statistical analysis of the data, for example comparing the variability of the depths and/or determining if the variability of the depths are consistent with corresponding edges of object in the scene. After regions having inaccurate depth measurements are identified at block 412, the method 400 proceeds to block 414.

At block 414, the method 400 determines if additional depth sensing via a second selected depth sensing method is needed based on one or more characteristics of the identification of the region having one or more inaccurate depth measurements. For example, if the method 400 determines that the depth map has an inaccurate region that is exceeds a threshold or meets other requirements for performing additional depth sensing, then the method 400 may select a second depth sensing method from the plurality of depth sensing methods and repeat blocks 408 to 414 until the method 400 determines that the depth map does not have any inaccurate or unreliable regions (or does not meet a minimum inaccuracy, unreliability, or error threshold requiring additional depth sensing methods) The determining at block 414 may also be based on a determination that any of the available depth mapping systems can add info to the existing depth map. If an additional depth map is determined to be necessary, then the generated depth maps may be fused into a single, spatially dependent depth map. At this point, the method 400 ends at block 416. In some embodiments, the method 400 may not end until each of the plurality of depth sensing methods has been used to generate a depth map.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus, comprising:
    a plurality of depth mapping systems comprising a first depth mapping system, a second depth mapping system and a third depth mapping system, each of the plurality of depth mapping systems configured to generate a depth map of an object in the apparatus field of view (FOV); and
    a processing system comprising a processor, the processing system configured to:
        generate a first depth map of the object in the apparatus FOV using the first depth mapping system;
        identify at least one region including one or more points of the first depth map having inaccurate depth measurements;
        generate a second depth map of the object in the apparatus FOV using the second depth mapping system;
        create a fused depth map using at least a portion of the first depth map and the second depth map;
        identify at least a second region of one or more points of the fused depth map having one or more additional inaccurate depth measurements; and
        determine whether to perform additional depth sensing using the third depth mapping system based on characteristics of the identified second region.

2. The apparatus of claim 1, wherein the fused depth map comprises at least a portion of the second depth map corresponding to the identified at least one region in the first depth map.

3. The apparatus of claim 1, wherein the fused depth map comprises a spatially dependent fusion of the first and second depth maps.

4. The apparatus of claim 1, wherein determining whether to perform additional depth sensing is based on the third depth mapping system providing better depth measurements than the depth measurements of the fused depth map.

5. The apparatus of claim 1, wherein the first depth mapping system is selected from at least one of a stereo vision depth mapping system, a structured light depth mapping system, or a shading depth mapping system.

6. The apparatus of claim 5, wherein the stereo vision depth mapping system, the structured light depth mapping system, and the shading depth mapping system-share hardware components in the apparatus.

7. The apparatus of claim 5, wherein the selection of the first depth mapping system is based on at least one of available storage space in the apparatus, available battery power of the apparatus, available depth resolutions, an environment of the apparatus, and a scene to be captured by the apparatus.

8. The apparatus of claim 5, wherein the selection of the first depth mapping system is based at least in part on a depth of the object in the apparatus FOV, an environment of the object, a location of the object within the apparatus FOV, and a characteristic of the apparatus.

9. The apparatus of claim 1, wherein the apparatus comprises a stereo imaging system and captures two or more images of the scene, and wherein the processing system is configured to sense first depth information by performing disparity matching on the two or more images.

10. A method, comprising:
    identifying a field of view of an imaging device;
    generating a first depth map of an object in the field of view using a first depth mapping system;
    identifying a region of one or more points of the first depth map having inaccurate depth measurements;
    generating a second depth map of the object in the field of view using a second depth mapping system;
    creating a fused depth map using at least a portion of the first depth map and the second depth map;
    identifying a second region of one or more points of the fused depth map having one or more inaccurate depth measurements in the fused depth map; and
    determining whether to perform additional depth sensing using a third depth mapping system based on characteristics of the identified second region.

11. The method of claim 10, wherein the fused depth map comprises a spatially dependent fusion of the first and second depth maps.

12. The method of claim 10, wherein determining whether to perform additional depth sensing comprises determining if the third depth mapping system will provide better depth measurements than the depth measurements of the fused depth map.

13. The method of claim 10, wherein the first depth mapping system is selected from at least one of a stereo vision depth mapping system, a structured light depth sensing system, or a shading depth sensing system.

14. The method of claim 13, wherein the stereo vision depth mapping system, the structured light depth sensing system, and the shading depth sensing system share hardware components in the imaging device.

15. The method of claim 13, wherein the selection of the first depth mapping system is based on at least one of available storage space in the imaging device, available battery power of the imaging device, available depth resolutions, an environment of the imaging device, and a scene to be captured by the imaging device.

16. The method of claim 13, wherein the selection of the first depth mapping system is based at least in part on a depth of the object in the field of view, an environment of the object, a location of the object within the field of view, and a characteristic of the imaging device.

17. The method of claim 10, further comprising performing disparity matching to sense depth information of the object in the field of view.

18. An apparatus, comprising:
    means for identifying a field of view of the apparatus;
    means for generating a first depth map of an object in the field of view using a first depth sensing system;
    means for identifying a region of one or more points of the first depth map having inaccurate depth measurements;
    means for generating a second depth map of the object in the field of view using a second depth sensing system;
    means for fusing the first depth map and the second depth map together to create a fused depth map;
    means for identifying a second region of one or more points of the fused depth map having one or more additional inaccurate depth measurements; and
    means for determining whether to perform additional depth sensing using a third depth sensing system based on characteristics of the identified second region.

19. The apparatus of claim 18, wherein the fused depth maps comprises a spatially dependent fusion of the first and second depth maps.

20. The apparatus of claim 18, wherein the means for determining whether to perform additional depth sensing is to determine if the third depth sensing system will provide better depth measurements than the depth measurements of the fused depth map.

21. The apparatus of claim 18, wherein the first depth sensing system is selected from at least one of a stereo vision depth mapping system, a structured light depth sensing system, and a shading depth sensing system.

22. The apparatus of claim 21, wherein the stereo vision depth mapping system, the structured light depth sensing system, or the shading depth sensing system share hardware components in the apparatus.

23. The apparatus of claim 21, wherein the selection of the first depth sensing system is based on at least one of available storage space in the apparatus, available battery power of the apparatus, available depth resolutions, an environment of the apparatus, and a scene to be captured by the apparatus.

24. The apparatus of claim 21, wherein the selection of the first depth sensing system is based at least in part on a depth of the object in the field of view, an environment of the object, a location of the object within the field of view, and a characteristic of the apparatus.

* * * * *